Sept. 12, 1961     J. STEIN     2,999,332
TABLE PLACE MAT
Filed Dec. 4, 1958
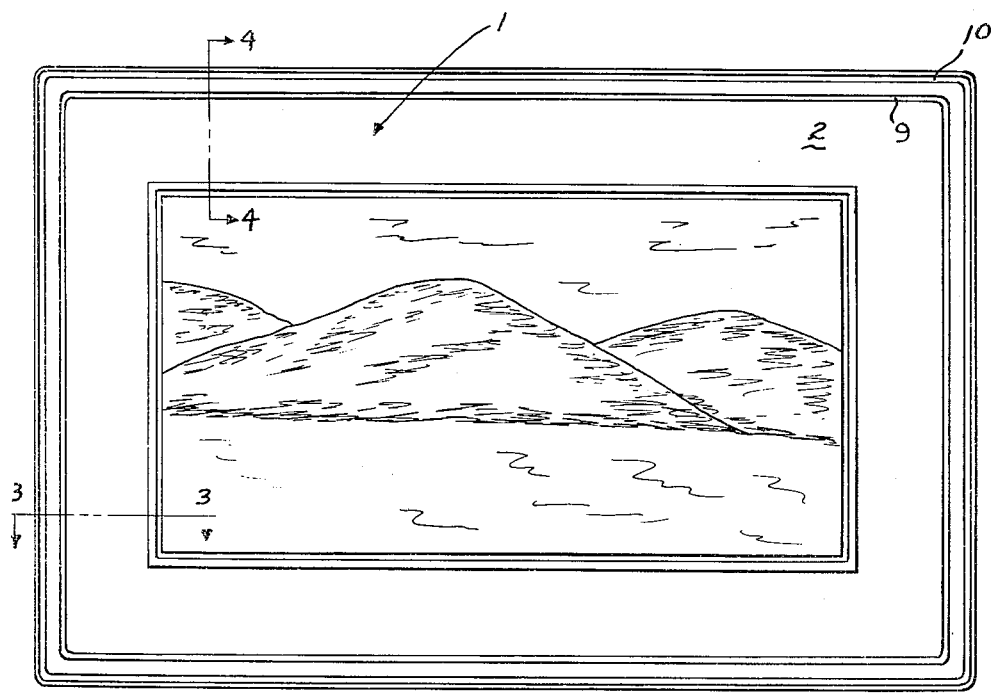
Fig-1
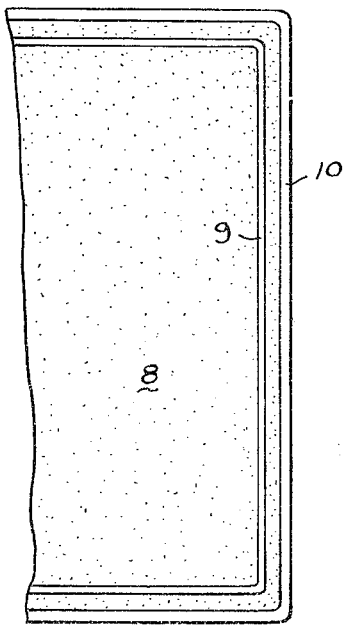
Fig-2
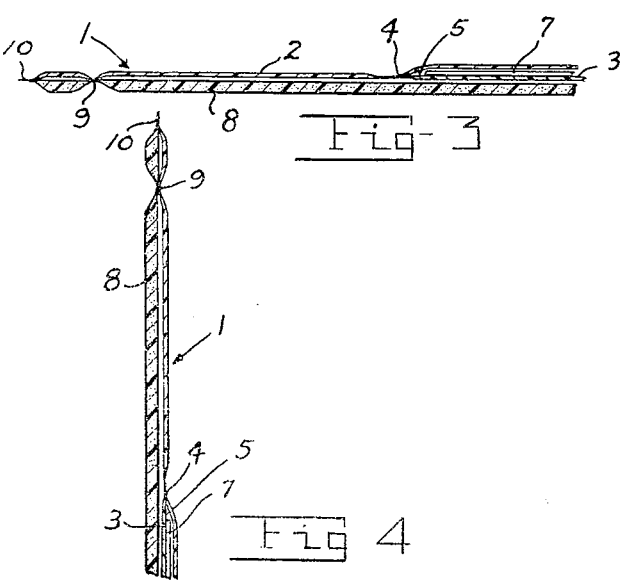
Fig-3
Fig 4
INVENTOR.
JACK STEIN
BY Tom Walker
ATTORNEY

United States Patent Office 2,999,332
Patented Sept. 12, 1961

2,999,332
TABLE PLACE MAT
Jack Stein, Dayton, Ohio, assignor to Art Industries, Inc., a corporation of Ohio
Filed Dec. 4, 1958, Ser. No. 778,187
3 Claims. (Cl. 45—68.4)

This invention relates to mats and more particularly to table type place mats.

The function of a place mat is that of a protective cover. The housewife prefers that a place mat be decorative and generally uses it intermediate dishes and the finished surface of the table top. The purpose is to minimize direct imposition of dirt, grime and moisture and prevent exposure of the surface to extremes of temperature. The present invention recognizes the primary functions of the place mat and carries the art a step forward by providing an extremely durable and utilitarian mat with features of advantage heretofore not contemplated in the art.

The place mat in accordance with the present invention has a highly protective and easily cleaned transparent upper surface revealing a visible decorative or informative presentation of an artistic nature in a hermetically sealed pocket. It is further provided with a plastic sponge-like undersurface which is absorbent in character and of an adherent nature.

The invention provides a place mat wherein decorative and informative matter is sealed as a distinct entity capable of maintaining its artistic presentation without change for the life of the mat. The nature of the upper surface of the mat is such that it can be wiped clean in an instant. Its undersurface rapidly absorbs and contains any moisture with which it may come in contact, adheres to the surface on which it is placed and has a particular relation to the means providing its upper surface minimizing the chance of accident in use thereof.

A primary object of the invention is to provide advantageous improvements in place mats rendering them economical to fabricate, more efficient, effective and satisfactory in use, adaptable to a wide variety of applications and extremely durable in character.

A further object of the invention is to provide an improved table place mat.

A further object of the invention is to provide an improved place mat having a plastic upper surface of an impermeable character and a sponge like under surface.

An additional object of the invention is to provide an improved place mat having a transparent upper surface formed with a hermetically sealed pocket for permanently maintaining a decorative or literary presentation therein in its original form for the life of the mat.

Another object of the invention is to provide an improved place mat having a smooth upper surface, a relatively sponge like under surface, and a sealed pocket formed therebetween rendering the place mat highly insulating, absorbent, and protective in character.

A further object of the invention is to provide a place mat possessing the advantageous structural features, the inherent meritorious characteristics and the mode of operation and utilization herein described.

A further object of the invention is to provide a place mat possessing the advantageous structural features, the inherent meritorious characteristics and the operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a plan view of the upper surface of a table place mat constituting an embodiment of the invention;

FIG. 2 is a plan view of the under surface of the mat shown in FIG. 1;

FIG. 3 is a cross-sectional view taken on line 3—3 of FIG. 1; and

FIG. 4 is a cross-sectional view taken on line 4—4 of FIG. 1.

Like parts are indicated by similar characters of reference throughout the several views.

The invention can be best described with particular reference to the embodiment illustrated in the drawings. As shown, the mat includes a rectangular sheet 1 of smooth transparent plastic providing its outer or upper surface 2. A second sheet section 3 of the same plastic material, which is rectangular but smaller in dimension, is centrally applied to the back of the sheet 1. The peripheral edge 4 of the section 3 is heat welded to the sheet 1 to form a hermetically sealed rectangular pocket 5 to the rear of the sheet 1.

A sheet 7 of paper or fabric having an artistic impression, either pictorial or literary, is hermetically sealed within the pocket 5 so as to have its artistic impression completely visible at the surface 2 of the sheet 1.

A rectangular sheet 8 of sponge like absorbent plastic having an outline identical with that of the sheet 1 is peripherally welded to the back of sheet 1. The peripheral connection of the impermeable plastic sheet 1 and the sponge-like plastic sheet 8 is provided by a pair of rectangular, parallel, closely spaced welds 9 and 10.

Thus, the place mat illustrated presents a smooth upper surface which is clear and transparent and can be wiped clean by a mere brushing movement over its outer surface. The artistic presentation, being hermetically sealed in the pocket to the rear of the sheet 1, will not deteriorate. The use of such a pocket avoids the rapid deterioration of plastic presentations as provided in place mat devices of the prior art. In case of spilling of liquids or moisture on the surface of a table to which the mat is applied the back of the mat itself can be quickly utilized to absorb the moisture or dampness resulting. Also, the mat will contain such moisture without harm to the decorative portion thereof due to its hermetic seal. The absorbent quality of the sheet 8 also enables small particles of food dust, ashes or the like to be caused to generally adhere to its surface.

The use of impermeable plastic in conjunction with a sponge plastic undersurface unconnected except peripherally provides maximum insulating characteristics to the mat which cannot be afforded by either a sponge mat alone or by a mat of impermeable plastic. There can be no significant transmission of heat or cold of any ordinarily encountered object through the mat from either direction. The fact that the sponge plastic portion is only peripherally sealed to the impermeable plastic sheet 1 enables that in the event of dirt and the like being absorbed or adhering to the sponge portion of the mat that the sponge portion, while integral with the mat unit, can be spaced from the sheet 1 and completely washed and pressed to rid it of the dirt and discoloration by conventional washing procedures. The fact that the sheet 8 has a sponge-like character enables its quick drying following any cleaning procedure. Of course, in the process of any cleaning of the mat the hermetic seal of the artistic presentation in a pocket affords it maximum protection.

An additional feature of the mat in accordance with the invention in that it has a greater safety factor in use than either a simple sponge mat or a simple plastic mat, or a fabric mat for that matter, since the separation of the sponge sheet 8 and impermeable plastic section 1 within their peripheries provides a dual resistance to displacement or slipping of the mat. For example, if an inadvertent axial force would be applied to the upper surface of the mat tending to displace it from a fixed position of use, there will be a relative motion of the impermeable plastic portion and the sponge portion resulting in a primary slipping friction and then a friction through the under surface of the mat unit to provide an advantageous staged resistance to its displacement.

It will be recognized that while the embodiment of the invention illustrated is in the form of a table place mat, the inventive features can be readily incorporated in a mat of any shape, size or form, depending on the application. This should be clearly obvious to those versed in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. A place mat, including a first flexible sheet of impermeable transparent plastic, a smaller flexible sheet of impermeable material imposed on said first sheet, a third flexible sheet of material having an artistic impression thereon hermetically enclosed between said first and second sheets and a layer of absorbent material welded to said first sheet and over said second sheet, the welds between said layer of absorbent material and said first sheet being outside the margins of said second smaller sheet and arranged to simulate a frame for the artistic impression of said third sheet.

2. A place mat, including a first sheet of impermeable transparent plastic, a second smaller sheet of impermeable material imposed on said first sheet, a sheet of material having an artistic impression thereon hermetically sealed between said first and second sheets and a layer of sponge like plastic material overlying said second sheet, the peripheral portions of said first sheet and said layer of plastic absorbent material being welded together, the connections between said first sheet and said plastic layer being formed by a pair of concentrically spaced narrow welds therebetween located outside the margins of said smaller second sheet and simulating a frame for the artistic impression of said sealed sheet of material.

3. A table place mat including a first sheet of transparent impermeable plastic having a second smaller sheet imposed on its under surface, a third sheet having artistic impressions on one surface thereof interposed between said first and second sheets and a peripheral weld of said second sheet to said first sheet containing said third sheet therebetween so as to present the artistic impressions thereof in a clear completely protected condition at the outer surface of said first sheet and skid-proof material connected to the under surface of said first sheet and over said second sheet, said skid-proof material being provided by a sheet of absorbent plastic having its periphery welded to said first sheet and having the portion within its periphery free thereof.

References Cited in the file of this patent

UNITED STATES PATENTS

| | | |
|---|---|---|
| 2,074,769 | Braun | Mar. 23, 1937 |
| 2,374,940 | Kemmler | May 1, 1945 |
| 2,522,612 | Harben | Sept. 19, 1950 |
| 2,670,567 | Meyer | Mar. 2, 1954 |
| 2,878,153 | Hacklander | Mar. 17, 1959 |
| 2,898,257 | Carver | Aug. 4, 1959 |